(12) United States Patent
Zheng

(10) Patent No.: US 10,643,753 B2
(45) Date of Patent: May 5, 2020

(54) HOLLOW PARTICLE BEAM EMITTER

(71) Applicant: Xian-Jun Zheng, Mississauga (CA)

(72) Inventor: Xian-Jun Zheng, Mississauga (CA)

( * ) Notice: Subject to any disclaimer, the term of this patent is extended or adjusted under 35 U.S.C. 154(b) by 361 days.

(21) Appl. No.: 15/584,528

(22) Filed: May 2, 2017

(65) Prior Publication Data

US 2017/0236601 A1 Aug. 17, 2017

Related U.S. Application Data

(63) Continuation of application No. 13/402,111, filed on Feb. 22, 2012, now abandoned.

(60) Provisional application No. 61/495,481, filed on Jun. 10, 2011.

(51) Int. Cl.
*G21B 1/19* (2006.01)
*G21B 3/00* (2006.01)

(52) U.S. Cl.
CPC .............. *G21B 1/19* (2013.01); *G21B 3/006* (2013.01); *Y02E 30/16* (2013.01)

(58) Field of Classification Search
CPC ... G21B 1/00; G21B 1/05; G21B 1/15; G21B 1/19; G21B 1/21; G21B 3/006; H05H 1/06; H05H 1/10; H05H 1/24; H05H 1/46; H05H 3/06; Y02E 30/10; Y02E 30/16; Y02E 30/30; Y02E 30/39; G21G 4/02

See application file for complete search history.

(56) References Cited

U.S. PATENT DOCUMENTS

| 2,940,011 A | 6/1960 | Kolb |
| 2,997,436 A | 8/1961 | Little et al. |
| 3,093,765 A | 6/1963 | Prevot |
| 3,234,426 A * | 2/1966 | Heil ........................ H01J 23/20 315/3.6 |
| 3,258,402 A | 6/1966 | Farnsworth |

(Continued)

FOREIGN PATENT DOCUMENTS

| CN | 87103025 A | 5/1988 |
| CN | 2563708 Y | 7/2003 |

(Continued)

OTHER PUBLICATIONS

Krasheninnikov, "Irradiation-induced phenomena in carbon nanotubes", Laboratory of Physics, Helsinki University of Technology, 2007.

(Continued)

*Primary Examiner* — Haissa Philogene
(74) *Attorney, Agent, or Firm* — Bereskin & Parr LLP/S.E.N.C.R.L., s.r.l.; Stephen Beney; Christopher Bury

(57) ABSTRACT

A particle beam emitter has a hollow particle beam tube having a first end portion, a second end portion, and a longitudinal axis. An electromagnetic system that includes a voltage supply is electrically coupled to the hollow particle beam tube and is configured to generate a primary electrical current flowing axially in the hollow particle beam tube from the first end portion towards the second end portion. A primary magnetic field associated with the primary electrical current is operable to induce a secondary electrical current in a plasma located within the hollow particle beam tube, the secondary electrical current flowing generally axially within the plasma and causing the plasma to contract inwardly towards the longitudinal axis.

9 Claims, 3 Drawing Sheets

(56) References Cited

U.S. PATENT DOCUMENTS

| | | | |
|---|---|---|---|
| 3,386,883 | A | 6/1968 | Farnsworth |
| 3,530,036 | A | 9/1970 | Hirsch |
| 3,530,497 | A | 9/1970 | Hirsch et al. |
| 3,533,910 | A | 10/1970 | Hirsch |
| 3,859,164 | A | 1/1975 | Nowak |
| 4,172,008 | A | 10/1979 | Fleet |
| 4,246,067 | A | 1/1981 | Linlor |
| 4,333,796 | A | 6/1982 | Flynn |
| 4,608,222 | A | 8/1986 | Brueckner |
| 4,788,024 | A | 11/1988 | Maglich et al. |
| 4,826,646 | A | 5/1989 | Bussard |
| 4,894,199 | A | 1/1990 | Rostoker |
| 5,162,094 | A | 10/1992 | Curtis |
| 5,160,694 | A | 11/1992 | Steudtner |
| 5,160,695 | A | 11/1992 | Bussard |
| 5,825,836 | A | 10/1998 | Jarmusch |
| 5,973,333 | A * | 10/1999 | Nakasuji ............... B82Y 10/00 250/492.23 |
| 6,168,503 | B1 | 1/2001 | Pao et al. |
| 6,845,929 | B2 | 1/2005 | Dolatabadi et al. |
| 6,850,011 | B2 * | 2/2005 | Monkhorst ............. G21B 1/00 315/111.41 |
| 7,482,607 | B2 * | 1/2009 | Lerner .................... G21B 3/00 250/493.1 |
| 7,718,000 | B2 | 5/2010 | Gruen |
| 7,741,615 | B2 | 6/2010 | Putterman et al. |
| 8,203,119 | B2 * | 6/2012 | Degenhardt .......... H01J 37/244 250/296 |
| 8,816,270 | B2 * | 8/2014 | Kramer .................. G21K 1/093 250/252.1 |
| 10,204,709 | B2 * | 2/2019 | Rogers .................... G21B 1/15 |
| 10,366,863 | B2 * | 7/2019 | Bleiner ................. H01J 37/244 |
| 2003/0053579 | A1 | 3/2003 | Waisman et al. |
| 2004/0110005 | A1 | 6/2004 | Choi et al. |
| 2005/0105664 | A1 | 5/2005 | Chubb |
| 2006/0008043 | A1 | 1/2006 | Shehane et al. |
| 2006/0198486 | A1 | 9/2006 | Laberge et al. |
| 2008/0247930 | A1 | 10/2008 | Hotto |
| 2008/0285700 | A1 | 11/2008 | Davis |
| 2009/0000268 | A1 | 1/2009 | Yurash |
| 2009/0303579 | A1 | 12/2009 | Winterberg |
| 2010/0061503 | A1 | 3/2010 | Popa-Simil |
| 2010/0063344 | A1 * | 3/2010 | Kotschenreuther ...... G21B 1/01 588/311 |
| 2010/0303188 | A1 | 12/2010 | Lawandy |
| 2013/0058446 | A1 | 3/2013 | Zheng |
| 2015/0294743 | A1 * | 10/2015 | Zheng .................... G21B 1/15 376/107 |
| 2017/0294238 | A1 * | 10/2017 | Zheng .................... G21B 1/01 |

FOREIGN PATENT DOCUMENTS

| | | |
|---|---|---|
| CN | 101443853 A | 5/2009 |
| CN | 101529998 A | 9/2009 |
| CN | 102089830 A | 6/2011 |
| CN | 103514964 B | 9/2018 |
| WO | 2005/001845 A2 | 1/2005 |
| WO | 2009/142530 A1 | 11/2009 |

OTHER PUBLICATIONS

Bachmann, "Remarks on Nonotechnology", Future Technologies Division, VOi Technologiezentrum GmbH, Feb. 22, 2010.
Cohen, "From Core to Corona", FusEdWeb, Fusion Energy Education, 2002, <https://fusedweb.llnl.gov/CPEP/Chart.Pages/5.Plasmas/SunLayers.html>.
Than, "Record Set for Hottest Temperature on Earth: 3.6 Billion Degrees in Lab", Live Science, 2006 <http://www.livescience.com/614-record-set-hottest-temperature-earth-3-6-billion-degrees-lab.html>.
General Fusion, accessed in 2010, <http://www.generalfusion.com>.
"Inertial Fusion Energy", National Ignition Facility & Photon Science—The Power of Light, 2009, <https://lasers.llnl.gov/programs/ife>.
"The Project", ITER, 2010 (accessed 2012) <http://www.iter.org/proj>.
"Tokamak", Wikipedia, 2004 (accessed 2012) <http://en.wikipedia.org/wiki/Tokamak>.
Uman, "Lightning", Dover Publications, Inc., New York, 1984, pp. 4-5.
McCracken, et al., "Fusion—The Energy of the Universe", second edition, Elsevier Inc., 2005, reprinted in 2013.
Haines, et al., Ion Viscous Heating in a Magneto-hydrodynamically Unstable Z Pinch at Over 2x1011.9 Kelvin, Phys. Review Lett. 96(7), Feb. 24, 2006.
Andrianov, et al., "High-Current Pulse Discharges", The 2nd United Nations International Conference on the Peaceful Uses of Atomic Energy 31, 348-364, 1958.
Idone, et al., "The Propagation Speed of a Positive Lightning Return Stroke", Geophysical Research Letters, vol. 14, No. 11, pp. 1150-1153, Nov. 1987.
Glenzer, et al., Cryogenic Thermonuclear Fuel Implosions on the National Ignition Facility, Physics of Plasma 19(5), May 31, 2012.
Thonemann, et al., "Controlled Release of Thermonuclear Energy-Production of High Temperatures and Nuclear Reactions in a Gas Discharge", Nature, 181, pp. 217-220, 1958.
Mosher, et al., "X-radiation from high energy density exploded wire discharges", Appl. Phys. Lett., 23, pp. 429-440, 1973.
Pereira, et al, "X rays from z-pinches on relativistic electron beam generators", J Appl. Phys., 64, pp. R1-27, 1988.
Shelkovenko, et al., "Evolution of the structure of the dense plasma near the cross point in exploding wire X pinches", Phys. Plasmas, 6, pp. 2840-2846, 1999.
Sinars, et al., "Time-resolved spectroscopy of AL, Ti, and Mo X pinch radiation using an X-ray streak camera", J. Quantitative Spectroscopy & Radiative Transfer, 78, pp. 61-83, 2003.
Burkhalter, et al., "X-ray line spectra from expoded-wire arrays", J. Appl. Phys., 50, 705-711, 1979.
Apruzese, et al., "Comparative analysis of time-resolved and time-integrated x-ray data from long-pulse z-pinch implosions on Saturn", Phys Plasmas, 8, pp. 3799-3809, 2001.
Christensen-Dalsgaard, et al., "The current state of solar modelling", Science, vol. 272, pp. 1286-1292, May 31, 1996.
Clayton, "Principles of Stellar Evolution and Nucleosynthesis", New York: McGraw-Hill, 1968.
Burbidge, et al., "Synthesis of the Elements in Stars", Review Modern Phys., 29, pp. 547-650, 1957.
Adelberger, et al., "Solar fusion cross sections II-pp chain and CNO cycles", Review of Modern Physics, vol. 83, pp. 195-245, Jan.-Mar. 2011.
Feldbacher, et al., "Nuclear Reaction Cross Sections and Reactivity Parameter Library and Files", File# IAEA-NDS-86, Revision 0, Oct. 1987.
Coleman, et al., "The hydrogen embrittlement of α-zirconium", J. Less-Common Metals, pp. 168-185, 1966.
Grossbeck, et al., "Low Temperature Hydrogen Embrittlement of Niobium II—Microscopic Observations", Acta Met., 25, 135, 1977.
Cann, et al., "An electron optical study of hydrides precipitation and growth at crack lips in zirconium", Acta met, 28, 1215, 1980.
Simpson, et al., "Fracture toughness of zirconium hydride and its influence on the crack resistance of zirconium alloys", J. Nucl. Mater., 87, pp. 303-316, 1979.
Fu, et al., "Fabrication and Characterization of Deuterated-Polystyrene Wire Used in Z-pinch Target", Chinese J. Atomic Energy Science & Tech., 39(6), pp. 543-546, 2005.
Kikuchi, "Frontiers in Fusion Research—Physics and Fusion", London/New York, Springer, 2010, reprinted in 2011.
Prialnik, "An Introduction to the Theory of Stellar Structure and Evolution", Chapters 2, 3, 5, Cambridge University Press, 2009.
Stephens, et al., "A potential X-pinch based point X-ray source for phase contrast imaging of inertial confinement fusion capsules", J. Phys. IV France, 133, pp. 761-765, 2006.
Haines, "Topical Review—A Review of the Dense Z-Pinch", Plasma Phys. Control. Fusion 53 (2011) 093001, pp. 1-168, Jun. 2, 2011.

(56) References Cited

OTHER PUBLICATIONS

Seife "Sun in a Bottle" 2008, Chapters 6, 9, and 10.
Doe "Report of the Review of Low Energy Nuclear Reactions" Dec. 1, 2004.
Close, "Too Hot to Handle: The Race for Cold Fusion" 1991.
Lawson, "Some Criteria for a Power Producing Thermonuclear Reactor" Proc. Phys. Soc. B70, pp. 6-10 (1957).
Edwards, et. al. "Progress towards ignition on the National Ignition Facility" Physics of Plasmas 20, 070501 (2013).
Park, et al., "High-Adiabat High-Foot Inertial Confinement Fusion Implosion Experiments on the National Ignition Facility", Physical Review Letters 112, 055001 (2014).
Burbidge et al., "Synthesis of the Elements in Stars", Reviews Modern Phys., 29(4): 547-650 (1957).
Williams, "The Hydrogen Embrittlement of Titanium Alloys", J. Inst. Metals, vol. 91, pp. 147-152 (1962).
Takano et al., "An Electron-Optical Study of beta-Hydride and Hydrogen Embrittlement of Vanadium", Acta Metall., vol. 22, pp. 265-274 (1974).
Perryman, "Pickering pressure tube cracking experience", Nuclear Energy, 17(2): 95-105 (1978).
Zakharov, et al., "Wire X-pinch in a high current diode", Soy. Tech. Phys. Lett., 8(9): 456-457 (1982).
Fewell, "The atomic nuclide with the highest mean binding energy", American Journal of Physics, 63(7): 653-658 (1995).
Deng et al., "Computer Simulation of Tritium Inventory and Leakage of the Fusion Experimental Reactor FEB-E", Fusion Science and Technology, 46(4): 548-560 (2004).
Deng et al., "Near surface bipartition model for the study of material response of plasma-facing surfaces exposed to energetic charged particles", NIMB, in Res. B, 259(2): 847-852 (2007).
Lee et al., "Measurement of the Elastic Properties and Intrinsic Strength of Monolayer Graphene", Science, 321(5887): 385-388 (2008).
Deng et al., "Tritium well depth, tritium well time and sponge mechanism for reducing tritium retention", Nuclear Fusion, 51(7): 073041 (2011).
Gryaznevich, "A quest for record high beta in tokamaks", Joint ITER-IAEA-ICTP Advanced Workshop on Fusion and Plasma Physics, Triest, Italy (Oct. 3-14, 2011).
International Search Report and Written Opinion dated Dec. 23, 2015 in related International Patent Application No. PCT/CA2015/050987.
Office Action and Search Report dated May 19, 2015 in corresponding CN Patent Application No. 201280028277.4.
Office Action and Search Report dated Apr. 26, 2018 in related CN Patent Application No. 201580065417.9.
Non-final Office Action and Notice of References Cited dated Jul. 2, 2019 in related U.S. Appl. No. 15/516,046.
Kalantar, "A Experimental Study of the Dynamics of X-Pinch and Z-Pinch Plasmas", Ph.D. Dissertation, Cornell University, 54-04(B): 2026 (1993).
Deng et al., "Quantum Effects on the Coulomb Logarithm for Energetic Ions During the Initial Thermalization Phase", Chin. Phys. Lett., 2002, 19(7): 962-963.
Snipes, "Plasma Operation in ITER", Joint ITER-IAEA-ICTP Advanced Workshop on Fusion and Plasma Physics, Trieste, Italy (Oct. 3-14, 2011).
Deng et al., "Additional Beta due to Fast Fusion Products in D-3HeFusion Plasma", Chin, Phys. Lett., 2003, 20(4): 544-546.

\* cited by examiner

HOLLOW PARTICLE BEAM EMITTER

This application claims the benefit of U.S. Provisional Application No. 61/495,481, filed Jun. 10, 2011, and is a continuation of U.S. application Ser. No. 13/402,111, filed Feb. 22, 2012, the entire contents of which are hereby incorporated by reference.

FIELD

Embodiments of the present invention relate to particle beam emitters and, more particularly, to particle beam emitters that include an electromagnetic system for generating an electromagnetic field to provide radial confinement of plasma within a hollow particle beam tube.

INTRODUCTION

Fusion power may generally refer to the power generated by nuclear fusion reactions. In one kind of fusion reaction that naturally occurs in many stars, such as the sun, two light atomic nuclei fuse together to form a heavier nucleus and, in doing so, release a large amount of energy. In some contexts, fusion power may also refer to the production of net usable power from a fusion source, similar to the usage of the term "hydroelectric power" to describe the production of net usable power from water driven turbines. Most design studies for fusion power plants are based on the controlled creation of fusion reactions to generate steam used to drive one or more turbine generators.

To date, peak fusion powers of 16.1 megawatts (21,600 hp) with efficiencies of 65% of input power have been achieved. Fusion power of over 10 MW (13,000 hp) has also been sustained for over 0.5 sec. Present designs are targeting sustained fusion power output of as much as ten times power input power. For example, 50 MW of input energy is targeted to produce 500 MW of output energy sustained over many minutes. It should be understood that these numbers are illustrative only.

SUMMARY

In accordance with one aspect, there is provided a particle beam emitter comprising: a hollow particle beam tube having a first end portion, a second end portion, and a longitudinal axis; and an electromagnetic system comprising a voltage supply electrically coupled to the hollow particle beam tube and configured to generate a primary electrical current flowing axially in the hollow particle beam tube from the first end portion towards the second end portion, whereby a primary magnetic field associated with the primary electrical current is operable to induce a secondary electrical current in a plasma located within the hollow particle beam tube, the secondary electrical current flowing generally axially within the plasma and causing the plasma to contract inwardly towards the longitudinal axis.

In some embodiments, the particle beam emitter further comprises a plurality of electromagnetic coils aligned axially with and surrounding at least a portion of the hollow particle beam tube for generating an axial magnetic field within the hollow particle beam tube.

In some embodiments, the particle beam emitter further comprises an insulation member positioned between the plurality of electromagnetic coils and the hollow particle beam tube.

In some embodiments, the particle beam emitter further comprises a pair of electromagnets positioned exterior to the hollow particle beam tube and rotatable about the longitudinal axis.

In some embodiments, the voltage supply is configured to generate the primary electrical current by creating a potential difference between the first end portion and the second end portion.

In some embodiments, the first end portion is configured to receive plasma from a fuel injector.

In some embodiments, the particle beam emitter further comprises a pressure valve positioned between the fuel injector and the first end portion of the hollow particle beam tube.

In some embodiments, the hollow particle beam tube is made from at least one of tungsten and graphite.

In some embodiments, the hollow particle beam tube comprises a hollow graphene cylinder having an inner surface coated with tantalum hafnium carbide.

BRIEF DESCRIPTION OF THE DRAWINGS

A detailed description of various embodiments is provided herein below with reference to the following drawings, by way of example only, and in which.

Figure 1:
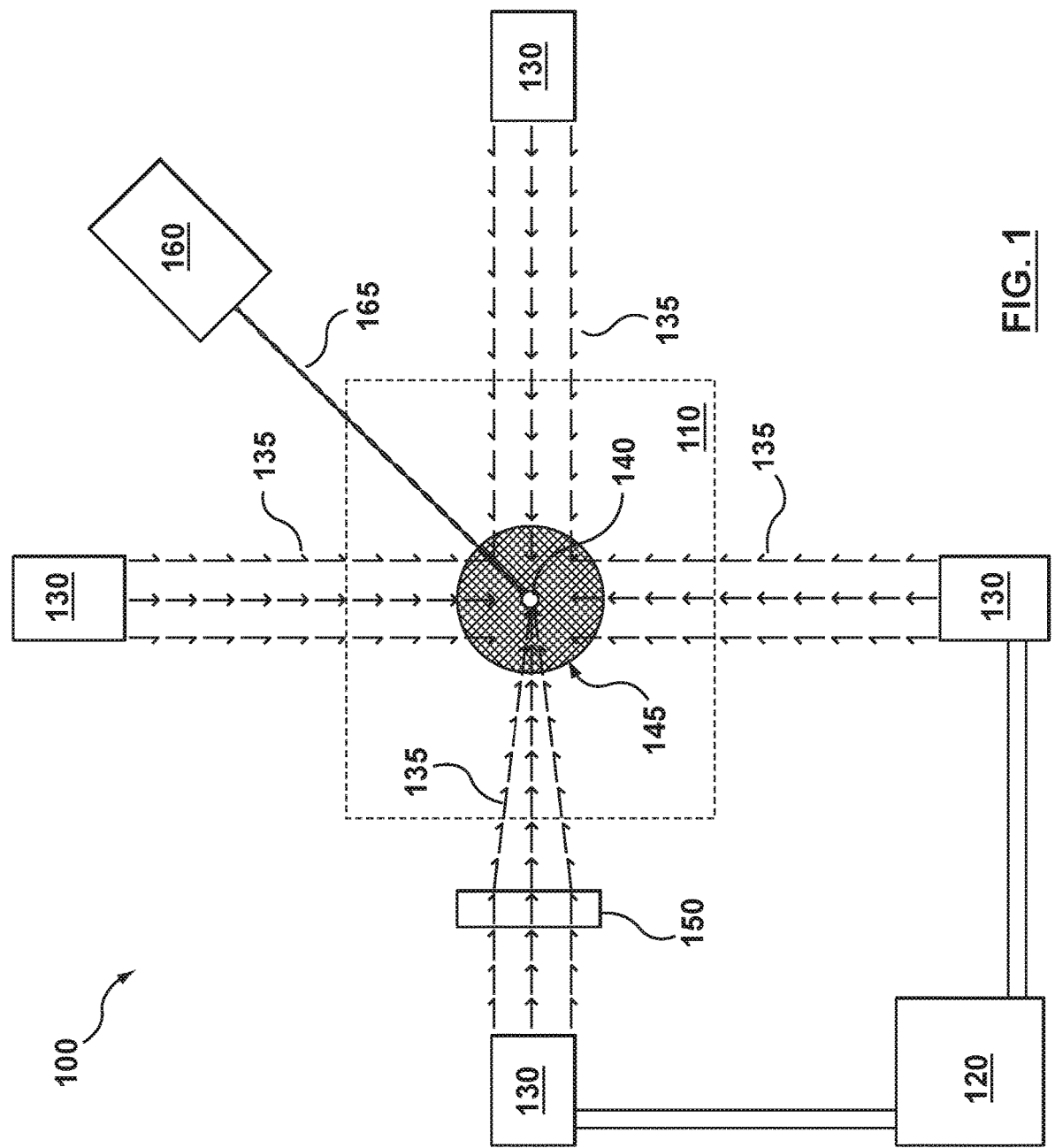
FIG. 1 is a schematic view of a thermonuclear reaction system.

It will be understood that reference to the drawings is made for illustration purposes only, and is not intended to limit the scope of the embodiments described herein below in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

Fusion Reaction Rate

As presently understood, fusion reactions are achieved by bringing two or more nuclei close enough to one another that their residual strong force (i.e., nuclear force) will act to pull the two or more nuclei together and form one larger nucleus. When two "light" nuclei fuse, the usual result is the formation of a single nucleus having a slightly smaller mass than the sum of the masses of the original two nuclei. In this case, the difference in mass between the single fused nucleus and the original two nuclei is released as energy according to the well-known mass-energy equivalence formula, $$E=mc^2. \qquad (1)$$

However, if two "heavy" nuclei of sufficient mass fuse together, the mass of the resulting single nucleus may be greater than the sum of the reactants' original masses. In this case, according to equation (1), a net input of energy from an external source will be required to drive such fusion reasons. Generally speaking, the dividing line between "light" and "heavy" nuclei is iron-56. Above this atomic mass, energy will generally be released by nuclear fission reactions; below it, by fusion.

The fusion of two nuclei is generally opposed by the repulsive electrostatic force created between the shared electrical charges of the two nuclei, specifically the net positive charge of the protons contained in the nuclei. To overcome this electrostatic force (referred to sometimes as a "Coulomb barrier"), some external source of energy is generally required. One way to provide an external source of energy is to heat the reactant atoms. This approach also has the additional benefit of stripping the atoms of electrons leaving the atoms as bare nuclei. Typically, the nuclei and electrons are formed into plasma.

As the temperature required to provide the nuclei with enough energy to overcome the repulsive electrostatic force varies as a function of the total charge, hydrogen, the atom having the smallest nuclear charge, tends to react at the lowest temperatures. Helium also has an extremely low mass per nucleon and is therefore also energetically favourable as a potential fusion product. Consequently, most fusion reactions are based on combining isotopes of hydrogen (protium, deuterium, or tritium) to form isotopes of helium, such as $^3$He or $^4$He.

Reaction cross section, denoted $\sigma$, is a measure of the probability of a fusion reaction as a function of the relative velocity of the two reactant nuclei. If the reactant nuclei have a distribution of velocities, as would be expected for a thermal distribution within plasma, then an average over the distributions of the product of cross section and velocity may be performed. Reaction rate, in terms of fusion per volume per unit of time, may then be defined as $\langle \sigma v \rangle$ times the product of the number density of reactant atoms. Accordingly, the reaction rate may equal:

$$f=(\tfrac{1}{2}n)^2 \langle \sigma v \rangle, \qquad (2a)$$

for one reactant, where n represents the number density of atoms of the single reactant, and:

$$f=n_1 n_2 \langle \sigma v \rangle, \qquad (2b)$$

for two different reactants, where $n_1$ represents the number density of atoms of a first reactant and $n_2$ represents the number density of atoms of a second reactant distinct from the first reactant.

The product $\langle \sigma v \rangle$ increases from near zero at room temperatures up to significant magnitudes at temperatures in the range of 10-100 keV (2.2-22 fJ). For similar plasma densities, deuterium-tritium (D-T) fusion tends to benefit from the lowest ignition temperature. Other possible fusions cycles include the proton-proton (p-p) fusion cycle, which provides the primary fusion power for stars like the Sun, the deuterium-deuterium (D-D) fusion cycle, the proton-boron (p-$^{11}$B, the deuterium-helium (D-$^3$He), and the helium-helium ($^3$He-$^3$He) cycle. However, these other fusion cycles typically require larger ignition energies and, in some cases, depend on $^3$He (which is relatively scarce on Earth).

Deuterium-Tritium Fuel Cycle

One nuclear reaction presently used in fusion power is the deuterium-tritium fuel cycle, which may be expressed as:

$$_1^2D + {}_1^3T \rightarrow {}_2^4He + {}_0^1n, \qquad (3)$$

where $_1^2D$ represented a Deuterium atom, $_1^3T$ represents a tritium atom, $_2^4He$ represents a helium atom, and $_0^1n$ represents a free neutron. Deuterium (also referred to as "Hydrogen-2") is a naturally occurring isotope of hydrogen and, as such, is universally available. Tritium (also referred to as "Hydrogen-3") is another isotope of hydrogen, but occurs naturally in small or negligible amounts due to its relatively brief radioactive half-life of approximately 12.32 years. Consequently, the deuterium-tritium fuel cycle requires synthesis of an ample supply of tritium atoms to be used in the fusion reaction. Two possible reactions to synthesize tritium from atoms of lithium include:

$$_0^1n + {}_3^6Li \rightarrow {}_1^3T + {}_2^4He, \qquad (4)$$

or alternatively:

$$_0^1n + {}_3^7Li \rightarrow {}_1^3T + {}_2^4He + {}_0^1n. \qquad (5)$$

The $^6$Li reaction is exothermic, providing a small energy gain for the reactor in the form of the released heat. On the other hand, the $^7$Li reaction is endothermic, thereby requiring energy, but does not consume the reactant neutron. At least some $^7$Li reactions may be used to replace neutrons lost due to reactions with other elements. In either lithium reaction, the reactant neutron may be supplied by the D-T fusion reaction shown above in equation (3). Most reactor designs take advantage of the naturally occurring mix of $^6$Li and $^7$Li lithium isotopes.

Several limitations are commonly associated with the D-T fuel cycle. For example, the D-T fuel cycle tends to produce substantial amounts of neutrons that induce radioactivity within the reactor structure and impose significant constraints on material design. Only about 20% of the fusion energy yield appears in the form of charged particles with the rest of the fusion energy being provided as neutron, which tends to limit the extent to which direct energy conversion techniques might be applied. The use of D-T fusion power also depends on available lithium resources, which are less abundant than deuterium resources and in growing demand due to increased production of Lithium based batteries and other related technologies. Yet another limitation of the D-T fuel cycle is that it requires handling of the radioisotope tritium. Similar to hydrogen, tritium can be difficult to contain and may leak from reactors in some quantity.

Proton-Proton Chain Reaction Occurring within Stars

As an alternative to the D-T fuel cycle, the proton-proton chain reaction is a naturally occurring process within stars of approximately the same size as the Sun or smaller. The proton-proton chain reaction is one of several fusion reactions by which stars of equal or lesser size as the Sun convert hydrogen to helium. However, unlike the D-T-fuel cycle, the proton-proton chain reaction does not induce radioactivity through neutron production.

In general, proton-proton fusion will occur when the temperature (i.e., kinetic energy) of the reactant protons is high enough to overcome their mutual electrostatic or Coulomb repulsion. While it is now accepted that proton-proton chain reactions are the dominant thermonuclear reactions fueling the sun and other stars, originally the temperature of the sun was thought to be too low to overcome the Coulomb barrier. However, through the discovery and development of quantum mechanics, it is now postulated that tunneling of the reactant protons through the repulsive electrostatic barrier allows for the proton-proton chain reason to occur at lower temperatures than the classical prediction permitted.

The first of multiple steps in the proton-proton chain reaction involves the fusion of two protons into deuterium, in the process releasing a positron, a neutrino and energy, as one of the reactant protons beta decays into a neutron. This step of the proton-proton chain reaction may be expressed as:

$$_1^1H + _1^1H \rightarrow _1^2D + e^+ + v_e + 0.42 \text{ MeV}, \quad (6)$$

where each $_1^1H$ represents a proton, $_1^2D$ represents a product deuterium atom, $e^+$ represents a positron, and $v_e$ represents a neutrino. This first step of the proton-proton chain is extremely slow, not just because the protons have to quantum tunnel through their Coulomb barrier, but also because the step depends on weak atomic interactions. To illustrate the speed of the reaction, deuterium-producing events are rare enough in the sun that a complete conversion of its hydrogen would take more than $10^{10}$ (ten billion) years given the prevailing conditions of the sun core. The fact that the sun is still shining is due to the slow nature of this reaction; if the reaction went faster, it is theorized that the Sun would have exhausted its hydrogen long ago.

In the next step of the proton-proton chain reaction, the positron is very quickly annihilated by an electron and the combined mass energy of the positron and electron is converted into two gamma rays and energy according to:

$$e^+ + e^- \rightarrow 2\gamma + 1.02 \text{ MeV}, \quad (7)$$

where each $\gamma$ represents a gammy ray. Subsequently, the deuterium atom produced in the first step of the proton-proton chain reaction fuses with another proton to produce a light isotope of helium, namely $^3$He, a further gamma ray and energy according to:

$$_1^2D + _1^1H \rightarrow _2^3He + \gamma + 5.49 \text{ MeV} \quad (8)$$

For temperatures in the range of about 10-14 MK (megakelvins), in the final step of the proton-proton chain reaction, two of the light isotopes of helium fuse together to form a $^4$He isotope, two protons and energy according to:

$$_2^3He + _2^3He \rightarrow _2^4He + _1^1H + _1^1H + 12.86 \text{ MeV}. \quad (9)$$

Combining the reaction steps expressed in equations (8) and (9) and canceling intermediate products, yields the overall proton-proton reaction given by:

$$_1^2D + _1^2D \rightarrow _2^4He + 2\gamma + 23.84 \text{ MeV} \quad (10)$$

In the Sun, the fusion path expressed in Equation (10) occurs with about 86% frequency with the remaining 14% due to other fusion reactions that prevail at temperatures exceeding 14 MK.

Referring initially to FIG. 1, there is illustrated a schematic view of a thermonuclear reaction system 100 in accordance with at least one embodiment described herein. Thermonuclear reaction system 100 includes a reaction chamber 110, a fuel injector 120, and a plurality of particle beam emitters 130 capable of generating a plurality of particle beams 135 composed of at least one type of thermonuclear fuel particle. The particle beam emitters 130 are supported spatially around and in fluid communication with reaction chamber 110, so that during operating of the thermonuclear reaction system 100, the particle beam emitters 130 emit the plurality of particle beams 135 into the reaction chamber 110. As discussed further below, the plurality of particle beams 135 are directed into the reaction chamber 110 wherein they interact in such a way that a thermonuclear reaction is instigated within the reaction chamber 110, which in at least some cases may be continuous (or pseudo-continuous) and self-sustaining.

The particle beams 135 may be composed wholly or in some cases only partially of high energy particles existing in a plasma state. Where the particle beams 135 are not composed wholly of plasma particles, the non-plasma particles within the particle beams 135 may retain a net charge, for example, a positive charge due to electron loss during ionization. In some embodiments, the non-plasma particles within the particle beams 135 may be neutralized within the reaction chamber 110 subsequently to being emitted from the particle beam emitters 130. Alternatively, in some embodiments, the non-plasma particles within the particle beams 135 may retain their net charge within the reaction chamber 110. Either may be used for the design of thermonuclear reaction system 100. However, one disadvantage of utilizing particle beams 135 at least partially containing charged, non-plasma fuel particles is the repulsive electrostatic forces that exist generally between any two charged particles. On account of the repulsive electrostatic force, it may be more difficult to realize a sufficiently high density of fuel particles within the reaction chamber 110 so as to initiate and sustain a thermonuclear reaction. By neutralizing any charged, non-plasma fuel particles within the reaction chamber 110 and thereby eliminating repulsive electrostatic forces between fuel particles in the particle beams 135, particle densities required for thermonuclear fusion may generally be easier to attain within the reaction chamber 110.

In some embodiments, the particle beams 135 may be generated by ionizing a supply of the at least one type of thermonuclear fuel particle provided by the fuel injector 120. After ionization, the charged particles within the particle beam emitters 130 may then be accelerated toward the reaction chamber 110. To neutralize any charged, non-plasma particles in the particle beams 135, for example, a supply of a low-pressure reactive gas may be pumped or otherwise provided into the reaction chamber 110 through a suitable gas inlet, so that individual charged particles in the particle beams 135 react with the neutralizing gas within the reaction chamber 110 and lose any retained charge.

As shown in FIG. 1, each of the particle beams 135 is directed toward a common focal region 140 of reaction chamber 110. The particle beams 135 may be directed toward the common focal region 140 by arranging the particle beam emitters 130 around the reaction chamber 110 in any suitable three-dimensional spatial orientation. For example, the particle beam emitters 130 may be arranged in a substantially spherical arrangement around the reaction chamber 110 or otherwise so that the particle beam emitters 130 are essentially equidistant from the common focal region 140. Alternatively, the particle beam emitters 130 may be arranged to be substantially symmetric in at least three different planes (e.g., as defined in a Cartesian coordinate system), which may in some cases be mutually orthogonal. However, other three-dimensional spatial orientations for the particle beam emitters 130 are possible as well.

In some embodiments, converging elements 150 may be provided in the path of the particle beams 135 to assist in directing the particle beams 135 towards the common focal region 140. While only one example of the converging elements 150 is explicitly illustrated in FIG. 1, in some embodiments, additional converging elements may be included in thermonuclear reaction system 100. Each of the converging elements 150 included may be associated with a single one of the particle beams 135 or, alternatively, two or more of the particle beams 135.

In some embodiments, where the particle beams 135 contain at least some charged, non-plasma fuel particles, some of the convergent elements 150 may be implemented using a magnetic lens. For example, the magnetic lens may consist of several electromagnetic coils arranged into a quadrupole, a sextupole, or some other suitable arrangement. When the electromagnetic coils are energized, the resulting quadrupolar or sextupolar magnetic field has a generally convex shape that deflects charged particles travelling through the magnetic field. The amount of deflection is controllable based upon the strength of the magnetic field, which in turn may be controlled by varying the energizing current supplied to the electromagnetic coils. In this way, the magnetic lens may be effectively utilized to focus or otherwise converge the particle beams 135 at the common focal region 140.

Alternatively, some of the converging elements 150 may be implemented using an electrostatic lens configured as a focusing element of charged particle beams. For example, in some embodiments, the electrostatic lens may be an Einzel lens, a cylinder lens, an aperture lens or a quadrupole lens. In some embodiments, the converging elements 150 may be a mixture of magnetic and electrostatic lenses.

Where the particle beams 135 are composed completely or nearly completely of plasma fuel particles, electrostatic or magnetic lenses will not generally be suitable for implementing the converging elements 150 because the plasma particles are electrically neutral overall and therefore not generally responsive to electromagnetic fields. However, it is still possible to alter the path of a neutral particle beam existing in complete or near complete plasma state and thereby focus the particle beams 135 at the common focal region 140. One example configuration to achieving this result is described below in more detail with reference to FIG. 2.

The inside surface of the reaction chamber 110 may be coated with a suitable insulating material to absorb any high energy gamma-rays produced during the thermonuclear reactions taking place within the reaction chamber 110. Different materials having generally different thermal and electrical properties may be used to coat the inside surface of the reaction chamber 110. For example, melting point and heat absorption capability may be two of the relevant considerations for choosing an appropriate coating material. As a coolant liquid (not shown) may be applied also to the inside surface of the reaction chamber 110 in some embodiments, another relevant consideration for the coating material may be its chemical reactivity with the particular coolant fluid used. A coating material that is generally non-reactive with the coolant liquid may be preferable. In some embodiments, nuclear graphite or graphene, tungsten or other materials having melting points equal to or greater than those of graphite and tungsten may be used for the material used to coat the inside surface of the reaction chamber 110.

Converging the particle beams 135 at the common focal region 140 causes the particle density existing at the common focal region 140 to increase. If the particle density rises to sufficiently high levels, a plasma sphere 145 is created in the vicinity of the common focal region 140 and having a sufficiently high temperature so as to instigate a thermonuclear fusion reaction within the reaction chamber 110. For example, the density of the plasma sphere 145 may be comparable to the densities found in the center of the Sun (i.e., up to 160,000 kg/m$^3$). By converging a sufficiently large number of the particle beams 135, each of which is composed of thermonuclear fuel particles accelerated with sufficient kinetic energy, the required particle densities for sustained thermonuclear reactions may be achieved in the reaction chamber 110. This result is also achieved without the contribution of gravity effects present in stars that assisting in sustaining the thermonuclear reactions that naturally occur in those and similar environments. Rather, particle and energy concentration is realized in the reaction chamber 110 through the acceleration and convergence of particle beams 135 at common focal region 140.

Optionally, an additional supply of input energy into the reaction chamber 110 may be directed toward to the common focal region 140 in order to assisting in igniting the plasma sphere 145 and thereby instigate the thermonuclear reaction. Accordingly, in some embodiments, a plurality of lasers 160 may be arranged spatially around reaction chamber 110 and, like the particle beam emitters 130, oriented toward common focal region 140 near the center of the reaction chamber 110. The 160 may generate and emit a plurality of laser beams 165 that also are convergent at common focal region 140. In some embodiments, laser guide tubes made of, for example, glass fibers (not shown) may extend some depth into reaction chamber 110 in order to guide the laser beams toward the common focal region 140.

In alternative embodiments, supplemental energy input devices (not shown) other than, or in addition to, the lasers 160 may also be used for igniting the plasma sphere 145 to assist instigation of thermonuclear reactions. For convenience only, and without limitation, only a single one of the lasers 160 is shown explicitly in FIG. 1, although more than one laser or other supplemental energy input device may be used. Moreover, any number of lasers 160 may be included and may be arranged spatially around the reaction chamber 110 in any suitable arrangement in order to accommodate the desired number of lasers 160.

In some embodiments, the energy generated by the thermonuclear fusion reactions occurring at or near common focal region 140 is sufficient to maintain the plasma sphere 145 at a sufficiently high temperature that continuous and sustained thermonuclear reactions may be instigated without the use of supplemental energy input devices (e.g., lasers 160). Accordingly, in some embodiments, the lasers 160 or other supplemental energy input devices may be omitted from the thermonuclear reaction system 100 and convergence of a sufficient number of the particle beams 135 accelerated to sufficient kinetic energies may suffice by themselves to both ignite and sustain thermonuclear fusion reactions.

However, convergence of the particle beams 135 by itself may not be sufficient to ignite the plasma sphere 145 and instigate a thermonuclear fusion reaction. Accordingly, in some embodiments, the lasers 160 or other supplemental energy input devices may be operated initially until a thermonuclear fusion reaction has been instigated within the reaction chamber 110, but thereafter then disabled. In that case, the heat generated from particle collisions due to convergence of the particle beams 135 may be sufficient to sustain continuous thermonuclear reactions within the reaction chamber 110 without benefiting from additional input energy supplied by the lasers 160 or other supplemental energy input devices.

Determining the specific parameters of thermonuclear reaction system 100 will generally involve detailed analytical calculations, computer simulations and fine-tuning fusion firing experiments. For example, specific parameters that should be determined include the number, density, temperature, size and velocity of particle beams 135, as well as the separation distance between particle beam emitters 130 and common focal region 140, and also the thickness of the coating material of reaction chamber 110. Additionally, if the lasers 160 are included in the thermonuclear reaction system 100, then the number, frequency and size of lasers 160 and laser beams 165 (and/or other supplemental energy input devices) should be determined, along with the distance between any laser guide tubes (where provided) and the common focal region 140. Different combinations and configurations of the elements described herein may be possible in different embodiments of the thermonuclear reaction system 100.

Figure 2:
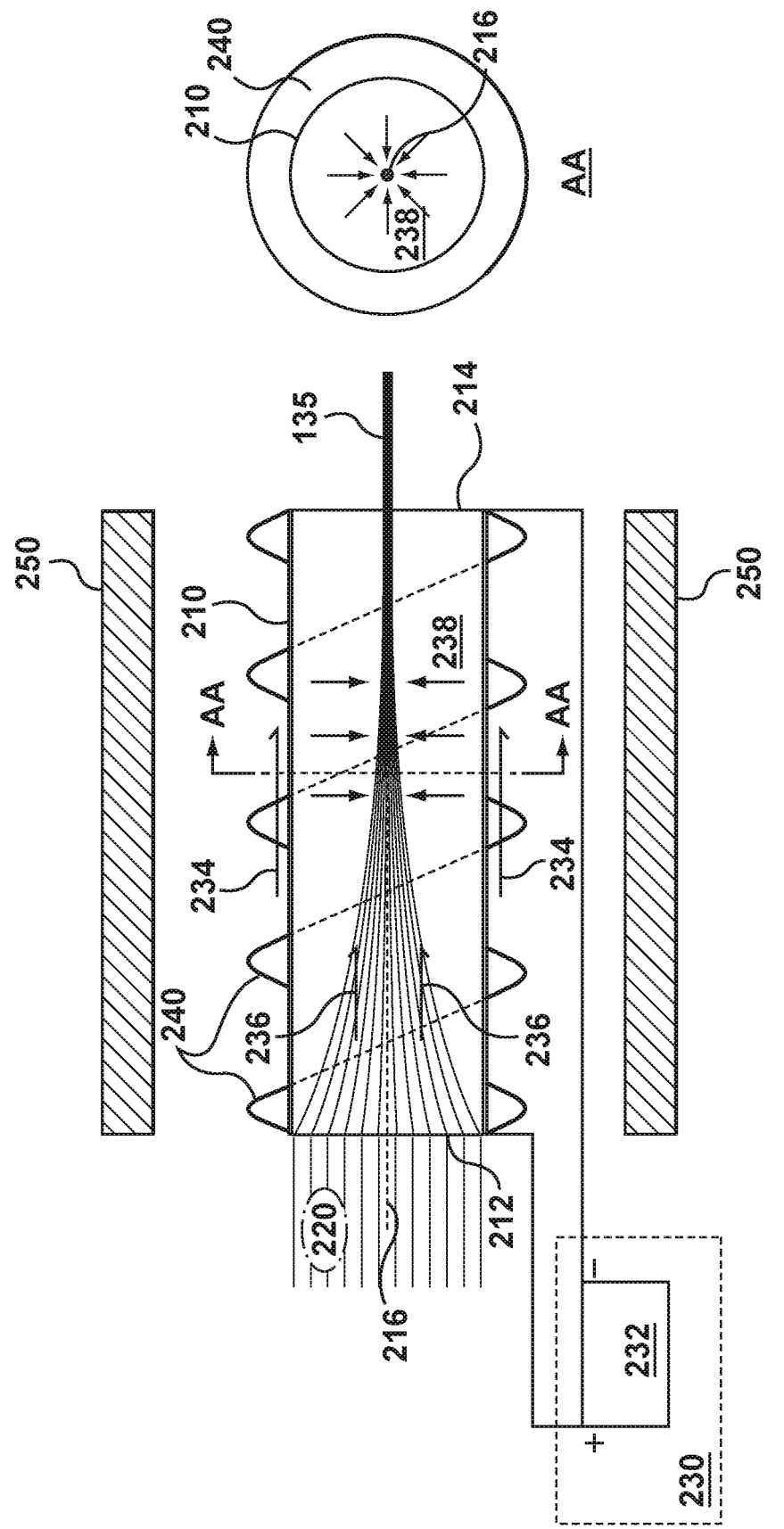
FIG. 2 is a schematic view of an exemplary particle beam emitter.

Reference is now made to FIG. 2, which illustrates a schematic view of an exemplary particle beam emitter 200, which may be used to implement any or all of the particle beam emitters 130 shown in FIG. 1 in accordance with at least one embodiment. Particle beam emitter 200 includes a hollow cylindrical particle beam tube 210 having a first end portion 212, a second end portion 214 and an inner surface (not shown). Particle beam tube 210 may be composed of an electrically conductive material having a melting temperature substantially above an equilibrium temperature of the high energy plasma or ionized particles housed within the particle beam emitter 200. In certain embodiments, particle beam tube 210 may be formed of a material or composition having a melting temperature exceeding 1,800° C. Alternatively, the inner surface of the particle beam tube 210 may be coated with a material or composition having a melting temperature of 1,800° C. or higher. Examples of suitable materials for forming or coating the inner surface of the particle beam tube 210 include, but are not limited, to tungsten and graphite. In some embodiments, particle beam tube 210 may be composed of a hollow graphene cylinder coated on the inner surface with a layer of tantalum hafnium carbide ($Ta_4HfC_5$), which has a melting point of about 4200° C., or some other chemical compound having a generally higher melting point than carbon based materials such as graphene.

In the example arrangement illustrated in FIG. 2, first end portion 212 of particle beam tube 210 is in fluid communication with a fuel injector (such as fuel injector 120 shown in FIG. 1) to receive a plasma 220 containing at least one type of thermonuclear fuel particle. For example, the plasma 220 may contain particles of $_1^1H$ or $_1^2D$ or some other type of thermonuclear fuel particle. Plasma 220 may typically be provided by the fuel injector to the particle beam tube 210 at a relatively high pressure and temperature. In order to provide the supply of the plasma 220 to the particle beam emitter 200, the fuel injector may convert an internal or separate external supply of thermonuclear fuel particles into their plasma state by heating and/or ionizing processes prior to the plasma 220 being received into the first end portion 212 of the particle beam tube 210.

Second end portion 214 of particle beam tube 210 is located opposite to the first end portion 212 and may be in fluid communication with the reaction chamber 110 (FIG. 1). This allows particle beam emitter 200 to emit a corresponding one of the particle beams 135 (FIG. 1) into reaction chamber 110. In some embodiments, at least a portion of second end portion 214 partially extends into reaction chamber 110 to a desired depth. The extension depth of the second end portion 214 may be varied depending on the application and to meet design and/or performance criteria for the thermonuclear reaction system 100 (FIG. 1). However, a minimum distance between second end portion 214 of each particle beam tube 210 and common focal region 140 (FIG. 1) should be maintained to ensure safe operation of the particle beam emitter 200 under the extreme operating conditions prevailing within reaction chamber 110. As discussed above, design calculations, computer simulations and fine-tuning fusion firing tests are required to determine the design parameters of embodiments of thermonuclear reaction system 100.

Particle beam emitter 200 may also include an electromagnetic system 230 for generating an electromagnetic field (not shown) to provide radial confinement and linear acceleration of plasma 220 within particle beam tube 210 using a variation of the "pinch" concept (sometimes also referred to as the "Z-pinch" concept). According to the pinch concept, the interaction between an electrical current flowing through plasma and an induced (and/or externally applied) magnetic field causes inward compression of the plasma in a direction orthogonal to the direction of the current flow through the plasma. In effect, by inducing an axial current flowing in a direction parallel to a central axis 216 of particle beam tube 210, plasma 220 behaves somewhat like a plurality of current-carrying wires where each wire is carrying current in the same axial direction. Consequently, the plasma "wires" are each pulled toward each other by the mutually acting Lorentz forces, the overall result of which being that plasma 220 contracts itself inwardly toward the central axis 216 of particle beam tube 210 wherein the plasma 220 is concentrated. As plasma 220 contracts inwardly and concentrates, the density of plasma 220 increases; denser plasmas can generate denser magnetic fields, increasing the inward force acting on plasma 220, and further compressing and concentrating the plasma 220 in the vicinity of the central axis 216.

In order to achieve pinching of the plasma 220, the electromagnetic system 230 may include a voltage supply 232 electrically coupled to particle beam tube 210 and configured to generate a primary electrical current 234 flowing in the hollow cylindrical section of particle beam tube 210. For example, the voltage supply 232 may create a potential difference between first end portion 212 and second end portion 214 so that the primary electrical current 234 flows therebetwen around the entire or substantially the entire periphery of the hollow cylindrical section. The magnetic field associated with the primary electrical current 234 induces a secondary electrical current 236 flowing generally axially within plasma 220 that creates the z-pinch effect detailed above.

When the parameters of primary electrical current 234 are suitably controlled (e.g., frequency and amplitude), secondary electrical current 236 will interact with the magnetic field associated with the primary electrical current 234 to generate a radial force field 238 within particle beam tube 210. Radial force field 238 is directed generally inwardly towards central axis 216. Radial force field 238 will urge any plasma 220 present in particle beam tube 210 toward central axis 216. As the density of plasma 220 increases, the resulting pressure gradient accelerates plasma linearly along central axis 216. A pressure valve or the like (not shown) at first end portion 212 prevents the plasma 220 from flowing back towards the fuel injector, and forces plasma 220 toward second end portion 214 at a relatively high velocity, where it is ejected from particle beam emitter 200 into the reaction chamber 110 as one of the particle beams 135. The exit velocity of the particle beams 135 may be controlled according to the pressure gradient experienced by plasma 220 during the electromagnetic pinch: the higher the pressure gradient experienced by the plasma 220, the higher the exit velocity of the particle beams 135.

In some embodiments, the voltage supply 232 may be coupled to the particle beam tube 210 included in each of an opposing pair of the particle beam emitters 130. As used herein, two of the particle beam emitters 130 may be understand to oppose one another when oriented approximately 180-degrees apart in a common plane so that the pair of particle beam emitters 130 are substantially in opposition to one another along a linear trajectory. Accordingly, when the particle beams 135 are emitted from the particle beam emitters 130 and the plasma sphere 145 is ignited, a closed electrical loop is formed between each opposing pair of the particle beam emitters 130 and the voltage supply 232 via the particle beams 135 and the plasma sphere 145. The voltage supply 232 (or alternatively another suitable voltage supply) may also be coupled to multiple opposing pairs of the particle beam emitters to form multiple corresponding closed electrical loops.

A high voltage initially supplied by the voltage supply 232 may be used to electrify individual fuel particles contained in the opposing pair of the particle beam emitters 130 forming part of the closed electrical loop. In response to application of the high voltage, the fuel particles may be turned into plasma 220 and thereafter develop the secondary electrical current 236 that causes pinching of the plasma 220 toward the central axis 216. Due to the closed electrical looping, the pinching may occur both within the particle beam tube 210, but may also continue as the particle beams 135 travel toward and converge at the common focal region 140, thereby further raising the particle density realized within the plasma sphere 145. The initially applied high voltage may be maintained or thereafter reduced in order to supply a desired level of constant electrical current in order to achieve desired level of energy concentration around the central axis 216 in the colliding pair of the particle beams 135. The number of pairs of the particle beams 135 included in closed electrical loops may also vary in order to create a desired level of energy concentration at common focal region 140 due to focusing of the particle beams 135.

In some embodiments, electromagnetic system 230 also includes a plurality of electromagnetic coils 240 aligned axially about central axis 216 along at least a portion of particle beam tube 210. Electromagnetic coils 240 are used to generate an axial magnetic field (not shown) within particle beam tube 210 that provides supplemental radial confinement of plasma 220 within particle beam tube 210. Consequently, the stability of the plasma 220 is increased as the plasma 220 is compressed along central axis 216 (as will be discussed further below). Electromagnetic coils 240 may typically surround particle beam tube 210 and may generally be located in close proximity to particle beam tube 210. In certain embodiments, the exterior of particle beam tube 210 supports the electromagnetic coils 240, although electromagnetic coils 240 may be separated from particle beam tube 210 by suitable thermal and/or electrical insulation members (not shown). Inclusion of electromagnetic coils 240 within the particle beam emitter 200 is optional and, in some cases, may depend on the required velocity of particle beams 135 for a particular fusion reactor design.

Alternatively, or additionally, particle beam emitter 200 may include external magnets 250 to provide supplemental radial confinement of plasma 220 within particle beam tube 210. External magnets 250 may include permanent magnets or electromagnets, and may be arranged in any suitable configuration that provides the desired magnetic field and desired supplemental confinement. For example, the position of the external magnets 250 relative to the particle beam tube 210 may be fixed or the external magnets 250 may be movably secured in relation to the particle beam tube 210 so as to be movable about the particle beam tube 210. The magnetic field generated by the external magnets 250 may therefore be static or time-varying as the case may be.

In some embodiments, the particle beam emitter 200 may include one pair of permanent magnets or electromagnets that are rotatable about the central axis 216. The time-varying magnetic field resulting from rotation of the external magnets 250 about the central axis 216 is also used to induce the secondary electrical current 236 within plasma 220 flowing in a generally axial direction (i.e., parallel to the central axis 216). To be rotatable about the central axis 216, the external magnets 250 may be attached to or otherwise supported by the particle beam tube 210. Alternatively, the external magnets 250 may be supported by an external support system (not shown) proximate to the particle beam tube 210.

In some embodiments, the external magnets 250 may include more than one pair of permanent magnets or electromagnets. Each pair of permanent magnets or electromagnets may be supported within the particle beam emitter 200 using a similar arrangement to what is described above. The configurations of each pair of permanent magnets or electromagnets may be identical or may vary with respect to one another. For example, the radial distance to the central axis 216 may be the same or different from pair to pair. Accordingly, at least one pair of permanent magnets or electromagnets may be spaced apart from the central axis 216 by a different radial distance from at least one other pair. Alternatively, each pair of permanent magnets or electromagnets may have the same radial spacing relative to the central axis 216.

The axial length and positioning of the external magnets 250 may also be varied in different embodiments. For example, in some embodiments, the external magnets 250 may span the entire axial length or nearly the entire axial length of the particle beam tube 210 (this arrangement is shown in FIG. 2 for illustrative purposes only). Alternatively, in some embodiments, two or more of the external magnets 250 separated by air gaps may be arranged in axial alignment along the length of the particle beam tube 210. In this case, the width of the air gaps between the external magnets 250 in axial alignment may be approximately equal. For example, two or three or any other suitable number of the external magnets 250 may span the axial length of the particle beam tube 210.

In some embodiments, particle beam emitter 200 is operated with a thermonuclear fuel mixture comprised of hydrogen and deuterium gases. The hydrogen and deuterium gases are heated in a fuel injector (such as fuel injector 120) in order to dissociate electrons from the hydrogen and deuterium nuclei until the hydrogen and deuterium gases exist completely or almost completely in their plasma states, thereby forming the plasma 220. Typically, this will involve heating the thermonuclear fuel mixture within the fuel injector to a temperature of at 1,800° C. or higher. Once heated, the mixture of hydrogen and deuterium plasma is supplied to first end portion 212 of particle beam tube 210 from the fuel injector. Inside the particle beam tube 210, the primary electrical current 234 generated by electromagnetic system 230 induces the secondary electrical current 236 within the plasma 220. As discussed above, the resulting electromagnetic field provides radial confinement and axial acceleration of the plasma 220 toward the second end portion 214.

In order to heat up the hydrogen and deuterium gases, the fuel injector in some embodiments may include a plurality of fuel channels fed through at least one high temperature furnace. The hydrogen and deuterium gases are pumped through the fuel channels (each fuel channel may house only one of the two gases) wherein heat radiated from the high temperature furnace brings the hydrogen and deuterium gases to the desired temperatures. To withstand the heat generated by the high temperature furnace, each of the fuel channels may be composed of a material or material composition having a very high melting point, for example, well above 1,800° C. For example, as noted above, graphite and tungsten are some non-limiting examples of suitable materials for the fuel channels.

Alternatively, in some embodiments, the hydrogen and deuterium gases may be mixed together within the fuel injector and converted into their plasma states through heating by other mechanisms or processes. For example, the mixture of hydrogen and deuterium gases may be subject to high-frequency electromagnetic waves during transport through the fuel injector to the particle beam emitter 200. The energy imparted by the high-frequency electromagnetic waves may be used to increase the kinetic energy of the pumped hydrogen and deuterium to high enough levels. Heating by high-frequency electromagnetic waves is similar to what takes place in some current tokamak machines, such as ITER. The fuel injector again may be formed or coated from a material or material composition having a very high melting point, for example, well above 1,800° C. Graphite, tungsten and tantalum hafnium carbide (Ta4HfC5) provide some non-limiting examples of suitable materials for the fuel injector.

The schematic arrangement shown in FIG. 2 is merely illustrative, and other arrangements could be used to effect particle beam emission. For example, each particle beam emitter 200 may comprise a plurality of particle beam tubes (similar to the particle beam tube 210), and each of the particle beam tubes may be capable of emitting one of the particle beams 135 into reaction chamber 110. That is, in some embodiments, the particle beam emitter 200 may be capable of emitting a plurality of particle beams 135 into reaction chamber 110.

Referring now to FIGS. 1 and 2, in some embodiments, one or more particle beam tubes (such as the particle beam tube 210) can extend into reaction chamber 110 by a certain distance to provide (additional) directional guidance to particle beams 135 in order to increase the convergence at common focal region 140 with other individual particles beams in the particle beams 135. However, a minimum distance between the second end portion 214 of each particle beam tube 210 and common focal region 140 should be maintained to ensure safe operation of particle beam emitters 130 under the extreme operating conditions in reaction chamber 110.

The second end portion 214 of the particle beam tube 210 may also be modified to have a gentle and smooth bend into a desired direction. The curvature of the second end portion 214 may be controlled to slightly alter or deviate the direction of the primary electrical current 234 near the second end portion 214. Consequently, the secondary electrical current 236 induced by the magnetic field associated with the primary electrical current 234 would also bend or deviate into the same desired direction due to the coupling between the primary electrical current 234 and the secondary electrical current 236. The deviation of the secondary electrical current 236 then alters the electromagnetic field within the particle beam tube 210 in a way that the high-energy particles emitted from the particle beam tube 210 are focused at and converge upon the common focal region 140. As noted above, this alternative confirmation of the particle beam emitter 200 may be used as an alternative or in addition to the converging elements 150.

As discussed above, determining the specific parameters of thermonuclear reaction system 100 will involve detailed analytical calculations, computer simulations and fine-tuning fusion firing experiments. For example, specific parameters that should be determined include the thickness and diameter of particle beam tube 210, the respective magnitudes of primary electrical current 234 and secondary electrical current 236, the magnitude and configuration of the magnetic fields generated by electromagnetic coils 240 and/or external magnets 250, and the separation distance between the particle beam tube 210 and the common focal region 140.

The thermonuclear reaction system 100 may operate using one or more types of suitable thermonuclear fuel particles as part of one or more known fusion reaction paths. For example, thermonuclear reaction system 100 can use deuterium, tritium, and lithium to effect a deuterium-tritium reaction cycle, as discussed above. In some embodiments, thermonuclear reaction system 100 uses a combination of $_1^1H$ and $_1^2D$ in order to effect a proton-proton fusion cycle, also discussed above. While $_1^2D$ is the primary source of energy in a proton-proton fusion cycle, $_1^1H$ particles are employed to produce a sufficient quantity of the intermediate product $_2^3He$ with the participation of $_1^2D$, although as discussed above $_1^1H$ can also be converted to $_1^2D$ in a slow process due to the effects of quantum tunneling and weak interactions.

The supply of $_1^1H$ and $_1^2D$ thermonuclear fuel particles for such a proton-proton reaction is virtually inexhaustible, as approximately one in every 6,500 hydrogen atoms on Earth is a deuterium atom, and both $_1^1H$ and $_1^2D$ can be readily extracted from seawater. One gallon of seawater would, in some embodiments, provide the equivalent energy output of approximately 300 gallons of gasoline.

Figure 3:
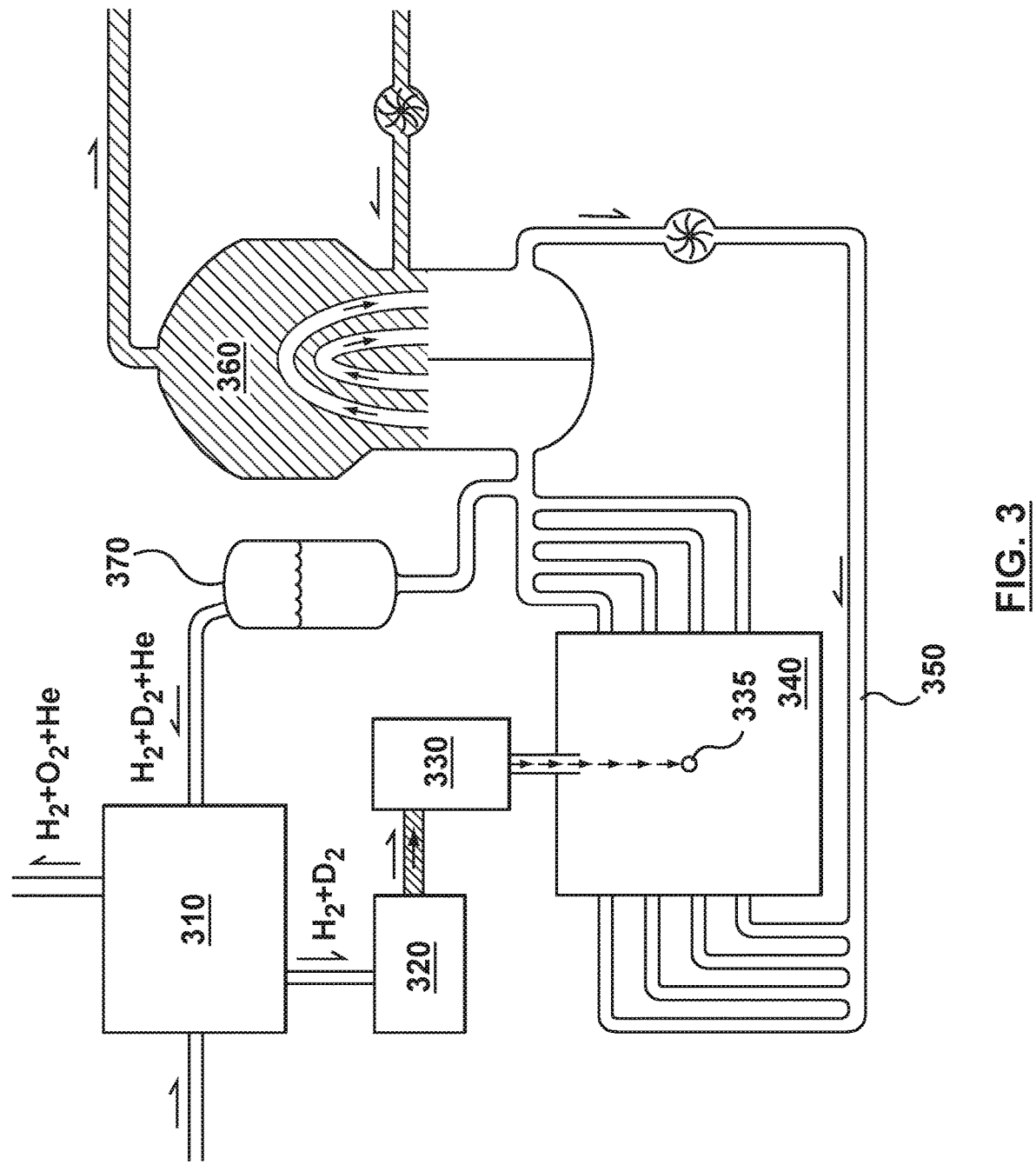
FIG. 3 is a schematic view of a thermonuclear reaction system integrated with an existing nuclear reactor design.

Referring now to FIG. 3, a schematic view of a thermonuclear reaction system integrated with an existing nuclear fission reactor design (such as the CANDU design) is illustrated in accordance with at least one embodiment. In this example embodiment, a continuous proton-proton fusion reaction is generated in a thermonuclear reaction system (such as the thermonuclear reaction system 100 shown in FIG. 1), and hydrogen and deuterium thermonuclear fuel particles are extracted from seawater in a separation facility 310.

After the removal of impurities, seawater containing deuterated water (sometimes referred to as HDO) and $H_2O$ enters a separation facility 310, where $_1^1H$ and $_1^2D$ are separated from $O_2$. The $_1^1H$ and $_1^2D$ gases produced by separation facility 310 subsequently enter a fuel injector 320 (which may be similar or equivalent to fuel injector 120 as described herein above with reference to FIG. 1) where the $_1^1H$ and $_1^2D$ gases are heated to form a plasma of thermonuclear fuel particles to be provided to one or more particle beam emitters 330 (which may be similar or equivalent to particle beam emitter 200 as described herein above with reference to FIG. 2).

As described above, particle beam emitters 330 may emit particle beams consisting of thermonuclear fuel particles towards a common focal region 335 of a reaction chamber

340, creating density and temperature conditions sufficient to instigate and, in at least some cases, sustain a continuous (or pseudo continuums) thermonuclear fusion reaction.

A primary cooling system 350 uses water (or any other suitable coolant liquid) to absorb at least some of the heat generated by the thermonuclear fusion reaction taking place within reaction chamber 340. Primary cooling system 350 is also connected to one or more steam generators 360; steam output from steam generator 360 can be used to drive turbines and generators (not shown) to produce electricity.

Integration with an existing nuclear reactor design may minimize the duration for design and manufacturing of an overall fusion reactor. For example, the existing CANDU reactor may be modified in accordance with embodiments of the present thermonuclear reaction system by substituting the Calandria fission reactor core with a fusion reaction chamber, removing the fuel bundles and fuelling machines, replacing the fuel channel assemblies with simple pressure tubes, installing particle beam emitters surrounding the fusion chamber, replacing the heavy water used in the CANDU design with regular water (as no neutrons need to be moderated), replacing the heavy water pressure reservoir with a gas collection tank 370, and adding the separation facility 310.

Gas collection tank 370 is used to collect un-reacted thermonuclear fuel particles and fusion reaction products, as not all of the $_1^1H$ and $_1^2D$ particles injected into the reaction chamber may undergo a fusion reaction with another reactant particle. In some embodiments, the gas collection tank 370 may operate based on the relative buoyancies of different fuel particles. For example, there is a relatively large difference in density between the reactant fuel particles in a thermonuclear reaction (e.g., the $_1^1H$ and $_1^2D$ particles) and the product particles of the fusion reaction (e.g., He particles), on the one hand, and the coolant fluid, on the other hand. Accordingly, the lighter gas particles will generally flow up through the coolant fluid due to buoyancy effects, resulting in a concentration of the lighter gas particles at an upper portion of the gas collection tank 370. The relatively heavy coolant fluid will correspondingly concentrate toward the lower portion of the gas collection tank 370.

In order to separate the lighter gas particles from the heavier liquid coolant, the gas collection tank 370 may include an outlet valve or other external feed in the upper portion through which the gas may be continually pumped. As the lighter gases exist as a mixture with the coolant fluid flowing through the primary cooling system, some of the gases may remain un-collected after one cycle of the coolant fluid through the primary cooling system. However, un-collected gases may eventually be collected by the gas collection tank 370 as the coolant liquid is continually pumped through the primary cooling system during additional cycles.

The un-reacted gases and fusion product collected in gas collection tank 370 may then be delivered to separation facility 310 for reuse. In addition to the un-reacted gasses and the fusion product, a small amount of coolant water close to the central region may dissociate into $H_2$, $D_2$ and $O_2$ due to the heat generated by a thermonuclear fusion reaction taking place within reaction chamber 340. If coolant water dissociates into $H_2$, $D_2$ and $O_2$, the $H_2$, $D_2$ and $O_2$ will be collected in gas collection tank 370 and moved to separation facility 310, following the similar path as $H_2$, $D_2$ and He gases shown in FIG. 3.

In some embodiments, the gas collection tank 370 may be modified by installation of at least one pressure valve in order to achieve an added functionality, i.e., coolant water pressure reservoir. This modification to the gas collection tank 370 would permit the gas collection tank 370 to control and achieve a desired level of pressure for the coolant liquid being pumped through the primary cooling system.

In order to maintain a desired level of $_1^2D$ concentration in the fuel particle circulation, for optimal performance of the thermonuclear reaction system, certain amount of $_1^1H$ gas may be moved out of separation facility 310, along with the $O_2$ and He gases. The desired level of $_1^2D$ concentration may be determined by detailed design calculations; the higher the $_1^2D$ concentration, the larger the fusion energy output of the thermonuclear reaction system.

In some embodiments, un-reacted fuel particles collected from the gas collection tank 370 may be mixed together with newly supplied fuel particles of the same or a different type in a closed loop circulation. For example, particles of Hydrogen-1 or a mixture of Hydrogen-1 and Hydrogen-2 collected from the gas collection tank 370 may be mixed together with a new supply of Hydrogen-1 or a mixture of Hydrogen-1 and Hydrogen-2. However, this example is not limiting. The resulting closed loop circulation of collected and new fuel particles may include one or more separation facilities (e.g., separation facility 310 in FIG. 3), one or more fuel injectors (e.g., fuel injector 120 in FIG. 1) and a plurality of particle beam emitters (e.g., particle beam emitter 200 in FIG. 2). The minimum operating temperature in the closed loop circulation may be maintained at 1800° C. or greater by the heat generated from thermonuclear fusion reactions occurring within the reaction chamber 110 as described herein. As a result, the fuel particles used to drive the thermonuclear fusion reactions are maintained essentially continuously in a plasma state without having the re-heat the fuel particles into plasma in the fuel injector prior to supplying the fuel particles to the particle beam emitter for re-emission in the reaction chamber 110.

As discussed above, thermonuclear reaction system 100 preferably uses a combination of $_1^1H$ and $_1^2D$ in order to effect a proton-proton fusion cycle. However, future generations of nuclear fusion reactors, may also be able to employ other elements—such as isotopes of He, B, Li, C, Ne, O, etc.—as thermonuclear fuel. In theory, a series of fusion reactions can be designed in order to maximize the energy output from a fusion reaction path (For example, a fusion reaction could be designed with the fusion path H→He→C→Ne→O→Si).

In some embodiments, seawater may be purified to remove sand, salt or other impurities and provided, through at least one fuel injector, to some or all of the particle beam emitters 200 shown in reference to FIG. 2 as a source of thermonuclear fuel. The purified seawater may be heated up in the at least one fuel injector or subsequently in the particle beam emitters. Heating of the purified seawater causes the water molecules to dissociate into $O_2$, $H_2$ and $D_2$ gases and, with a sufficiently hot source of heat, at least some part of the $H_2$ and $D_2$ gases further turn into plasma due to increasing temperature. Accordingly, in some embodiments, the purified seawater is automatically separated into different thermonuclear fuel types by heating inside the at least one fuel injector or subsequently inside at least some of the particle beam emitters 200. Consequently no additional separation facilities will be needed in at least some cases to provide the thermonuclear fuel used in the thermonuclear reaction system 100.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative only and non-limiting.

The invention claimed is:

1. A particle beam emitter comprising:
a hollow particle beam tube having a first end portion, a second end portion, and a longitudinal axis; and
an electromagnetic system comprising a voltage supply electrically coupled to the hollow particle beam tube and configured to generate a primary electrical current flowing axially in the hollow particle beam tube from the first end portion towards the second end portion, whereby a primary magnetic field associated with the primary electrical current is operable to induce a secondary electrical current in a plasma located within the hollow particle beam tube, the secondary electrical current flowing generally axially within the plasma and causing the plasma to contract inwardly towards the longitudinal axis.

2. The particle beam emitter of claim 1, further comprising a plurality of electromagnetic coils aligned axially with and surrounding at least a portion of the hollow particle beam tube for generating an axial magnetic field within the hollow particle beam tube.

3. The particle beam emitter of claim 2, further comprising an insulation member positioned between the plurality of electromagnetic coils and the hollow particle beam tube.

4. The particle beam emitter of claim 1, further comprising a pair of electromagnets positioned exterior to the hollow particle beam tube and rotatable about the longitudinal axis.

5. The particle beam emitter of claim 1, wherein the voltage supply is configured to generate the primary electrical current by creating a potential difference between the first end portion and the second end portion.

6. The particle beam emitter of claim 1, wherein the first end portion is configured to receive plasma from a fuel injector.

7. The particle beam emitter of claim 6, further comprising a pressure valve positioned between the fuel injector and the first end portion of the hollow particle beam tube.

8. The particle beam emitter of claim 1, wherein the hollow particle beam tube is made from at least one of tungsten and graphite.

9. The particle beam emitter of claim 1, wherein the hollow particle beam tube comprises a hollow graphene cylinder having an inner surface coated with tantalum hafnium carbide.

* * * * *